United States Patent
Gong et al.

(10) Patent No.: US 10,913,167 B2
(45) Date of Patent: Feb. 9, 2021

(54) SEALING ARRANGEMENT FOR USE IN ROBOT JOINT

(71) Applicant: ABB Schweiz AG, Baden (CH)

(72) Inventors: Yuhong Gong, Shanghai (CN); Xiaodong Cao, Shanghai (CN); Yun Ha, Shanghai (CN); Xinguo Fu, Shanghai (CN); Linjian Liang, Shanghai (CN)

(73) Assignee: ABB Schweiz AG, Baden (CH)

( * ) Notice: Subject to any disclaimer, the term of this patent is extended or adjusted under 35 U.S.C. 154(b) by 137 days.

(21) Appl. No.: 16/376,371

(22) Filed: Apr. 5, 2019

(65) Prior Publication Data

US 2019/0232506 A1 Aug. 1, 2019

Related U.S. Application Data

(63) Continuation of application No. PCT/CN2016/108582, filed on Dec. 5, 2016.

(51) Int. Cl.
*B25J 19/00* (2006.01)
*F16J 15/40* (2006.01)

(52) U.S. Cl.
CPC .......... *B25J 19/0079* (2013.01); *F16J 15/406* (2013.01); *Y10T 74/20329* (2015.01)

(58) Field of Classification Search
CPC ..... B25J 19/0075; B25J 19/0079; F16J 15/14; F16J 15/40; F16J 15/406; Y10T 74/20329
See application file for complete search history.

(56) References Cited

U.S. PATENT DOCUMENTS

| | | | | |
|---|---|---|---|---|
| 3,735,990 A | * | 5/1973 | Steegmuller | F16J 15/54 277/346 |
| 4,698,568 A | * | 10/1987 | Nishizawa | B25J 19/0029 318/481 |
| 4,716,785 A | * | 1/1988 | Godai | B25J 9/0081 74/606 R |

(Continued)

FOREIGN PATENT DOCUMENTS

| AT | 389482 B | 12/1989 |
|---|---|---|
| CN | 101134319 A | 3/2008 |

(Continued)

OTHER PUBLICATIONS

European Patent Office, Extended European Search Report issued in corresponding European application No. 16923318.6, dated Jun. 8, 2020, 7 pp.

(Continued)

*Primary Examiner* — Nicholas L Foster
(74) *Attorney, Agent, or Firm* — Taft Stettinius & Hollister LLP; J. Bruce Schelkopf (57) ABSTRACT

A sealing arrangement for application in a robot joint. The sealing arrangement includes: a circular sealing assembly arranged between a swing and a base of the robot joint in a longitudinal direction, the circular sealing assembly defining a tubular cavity in a circumferential direction and having a gas inlet and a gas outlet; and an air channel coupled to the gas inlet and operable to continuously conduct pressured air flow into the cavity to maintain an air pressure inside the cavity above an air pressure outside the cavity, and thereby a high-speed airflow out of the gas outlet.

20 Claims, 7 Drawing Sheets

(56) References Cited

U.S. PATENT DOCUMENTS

| | | | | |
|---|---|---|---|---|
| 4,732,526 | A * | 3/1988 | Nakashima | B25J 9/046 310/88 |
| 4,984,745 | A * | 1/1991 | Akeel | B05B 13/0431 239/587.2 |
| 5,065,062 | A * | 11/1991 | Uehara | B25J 19/0079 310/114 |
| 5,212,432 | A * | 5/1993 | Ohtani | B25J 9/046 310/56 |
| 5,421,218 | A * | 6/1995 | Akeel | B05B 13/0431 414/735 |
| 6,039,068 | A * | 3/2000 | Tessier | B25J 19/0079 137/377 |
| 7,878,088 | B2 | 2/2011 | Tamura et al. | |
| 9,399,301 | B2 | 7/2016 | Nakanishi | |
| 10,603,801 | B2 * | 3/2020 | Zhu | B25J 19/0075 |
| 10,675,771 | B2 * | 6/2020 | Groll | F16J 15/3228 |
| 2008/0258402 | A1 * | 10/2008 | Tamura | B25J 19/0075 277/345 |
| 2017/0266820 | A1 * | 9/2017 | Zhu | B25J 19/0075 |
| 2017/0361471 | A1 * | 12/2017 | Groll | F16J 15/3228 |

FOREIGN PATENT DOCUMENTS

| | | |
|---|---|---|
| CN | 203730763 U | 7/2014 |
| CN | 104812536 A | 7/2015 |
| DE | 102014226144 A1 | 6/2016 |
| EP | 1894684 A1 | 5/2008 |
| EP | 2929989 A1 | 10/2015 |
| JP | H01222887 A | 9/1989 |
| JP | H02205493 A | 8/1990 |
| TW | 201124243 A | 7/2011 |
| WO | 99/08841 A1 | 2/1999 |
| WO | 2016096866 A1 | 6/2016 |

OTHER PUBLICATIONS

State Intellectual Property Office of the P.R. China, International Search Report & Written Opinion issued in corresponding Application No. PCT/CN2016/108582, dated Aug. 25, 2017, 13 pp.

* cited by examiner

SEALING ARRANGEMENT FOR USE IN ROBOT JOINT

FIELD

Embodiments of present disclosure generally relates to a mechanical apparatus, and more particularly, to a sealing arrangement for use in a robot joint.

BACKGROUND

Robots, especially industrial robots (also called robot arms) have been widely utilized to aid manufacturers, for example, improve productivity, product quality and worker safety in various application fields. Industrial robots have various axis configurations. The vast majority of articulated robots normally enable multiple degrees (for example, four to six degrees) of freedom depending on the designed number of axis. In general, robots with more axes allow for greater flexibility and can perform a wider variety of applications than robots with fewer axes.

Axis 1 of an industry robot is a robot joint between the robot base and the swing. This axis allows the robot to rotate and sweep over a wide range to cover the area on either side of the robot and even behind the robot. In some cases, this axis allows the robot to spin up to a full 180 degree range from the center point.

However, for most of the current industrial robots, there is usually a gap existing in a region of Axis 1 between the base and the swing. In this case, pollutions/contaminants from the ambient, and otherwise, debris generated during the operation of the industry robot might cause issues and directly impact the performance of industrial robots. For example, the produced metal debris will be splashed around, or some liquid pollution might flow into the internal space of Axis 1 when the robot is operating in humid ambient. Once the infiltration of contaminants occurs, the internal structure of Axis 1 might be damaged, which will inevitably deteriorate the performance of the Axis 1 and thus the overall performance of the robot.

SUMMARY

In first aspect, a sealing arrangement for use in a robot joint is provided. The sealing arrangement comprises: a circular sealing assembly arranged between a swing and a base of the robot joint in a longitudinal direction, the circular sealing assembly defining a tubular cavity in a circumferential direction and having a gas inlet and a gas outlet; and an air channel coupled to the gas inlet and operable to conduct pressured air flow into the cavity to maintain an air pressure inside the cavity above an air pressure outside the cavity, and thereby a high-speed airflow out of the gas outlet.

Such sealing arrangement can rely on its circular sealing assembly to effectively isolate the internal space of Axis 1 from especially the external solid contaminants. Further, with such continuously directed higher-pressure air flow into the cavity, a relative high-speed airflow out of the gas outlet can be achieved. In such a way, the liquid pollutions/contaminants can be stopped outside the cavity. In this way, a more reliable protection of the internal structure of Axis 1 can be achieved.

In some embodiments, the circular sealing assembling comprises: a sealing ring forming a first side wall and a top wall of the cavity, wherein the first side wall is oriented in the longitudinal direction and the top wall is fixed to the swing and oriented in a horizontal direction that is substantially perpendicular to the longitudinal direction.

In some embodiments, the circular sealing assembling further comprises: a base ring coaxially arranged with the sealing ring and forming a second side wall of the cavity, wherein the second side wall is oriented opposite to the first side wall. Such vertically oriented base ring (or the second side wall of the cavity), as the outmost barrier/blocking component, can effectively reduce the risk of the solid contaminants entering into the internal space of Axis 1 structure. In some embodiments, the gas outlet is defined by the base ring together with the sealing ring, and thus the size of the gas outlet can be properly designed and tuned as needed.

In some embodiments, the circular sealing assembling further comprises: a radial seal arranged coaxially with the sealing ring and forming a bottom wall of the cavity, wherein the radial seal is positioned between a third side wall of the base and the first side wall in a radial direction.

In some embodiments, the radial seal is elastically arranged between the third side wall and the first side wall to abut against the third side wall and the first side wall in the radial direction.

In some embodiments, at least a portion of the radial seal is made of flexible material. The flexible material can help achieve a better sealing effect as it enables a sufficient contact with the counterpart surface.

In some embodiments, the flexible material is rubber.

In some embodiments, the sealing arrangement further comprising: an air tube connected to the air channel via a tube connector, wherein the air tube is operable to conduct the pressured air that is supplied from an external air source.

In some embodiments, the air pressure inside the cavity is in a range of 35 KPa to 55 KPa.

In some embodiments, the air pressure inside the cavity is approximately 45 KPa. Such properly tuned air pressure inside the cavity is beneficial, because it not only provides a stable and sufficient pressure to against the contaminant's infiltration, but also avoids a too high pressure at which the radial seal may lose its sealing ability In second aspect, a robot joint is provided. The robot joint comprises: a base; a swing coupled to the base; and the sealing arrangement according to the first aspect of present disclosure.

It would be apparent through the following discussions that by using such sealing arrangement along with a continuously provided high air pressure inside the cavity of the sealing arrangement according to various embodiments of the present disclosure, the infiltration of solid and liquid pollutions or contaminants can be effectively avoided, and thereby a more reliable robot joint protection for Axis 1 can be achieved. Furthermore, such sealing arrangement according to various embodiments of the present disclosure has a simply structure/design, which enables a simple and straightforward manufacture/assembly process with a low cost.

DESCRIPTION OF DRAWINGS

Drawings described herein are provided to further explain the present disclosure and constitute a part of the present application. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

Figure 1:
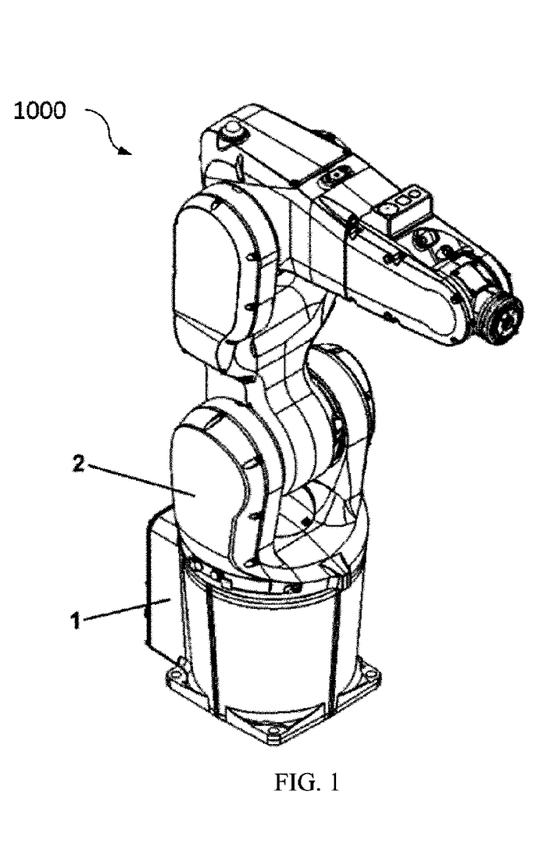
FIG. 1 is a perspective view of an industrial robot in an assembled state.
Figure 2:
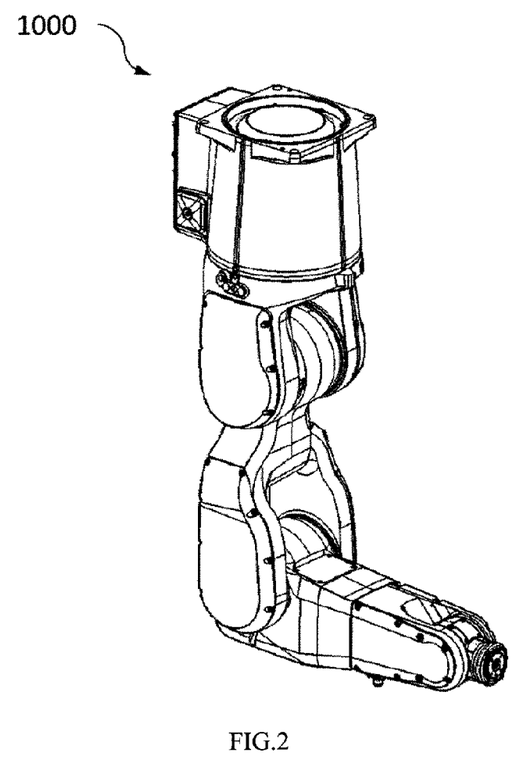
FIG. 2 is a perspective view of an industrial robot of FIG. 1 applied in an upside down orientation in an assembled state.

FIG. 1 illustrates a general view of an industrial robot 1000 according to an embodiment of the present disclosure. Such industrial robot as shown in FIG. 1 may be used as a grinding/polishing machine to handle surface grinding and polishing process. For instance, such industrial robot may be used for grinding/polishing the case of a cellphone. In a standard position as illustrated in FIG. 1, the base 1 is fixed on the ground, and the swing 2 that is arranged on top of the base 1 could rotate around the Axis 1 which is defined as a robot joint between a base 1 and a swing 2, so that the swing 2 could sweep within a large operation area. The industrial robot 1000 may also be adapted to be used in an upside down orientation as shown in FIG. 2, depending on the specific requirements and operating conditions.

As discussed above, the debris (such as metal debris) produced during the grinding process might be splashed around in an uncontrolled way and thereby increasing the risk of the infiltration of debris into the gap between the base 1 and the swing 2. In particular, when the robot is used in humid environments, such as wet grinding environment, cooling water is normally introduced in order to cool down the heat produced during the grinding process. In this case, even some blocking structures (for example, the wall of a base ring) may be designed and arranged to block the splashed solid debris, the slurry-like mixture produced from the cooling water and the debris may still be able to flow into the internal structure of Axis 1 due to the liquid surface tension. Liquid surface tension helps the liquid climb over the wall to arrive at the internal space of the Axis 1 structures, such as sealing structure, drive train structure, electrical parts and cables, which will damage the internal Axis 1 structure and thereby deteriorate the overall performance of the robot.

Figure 3:
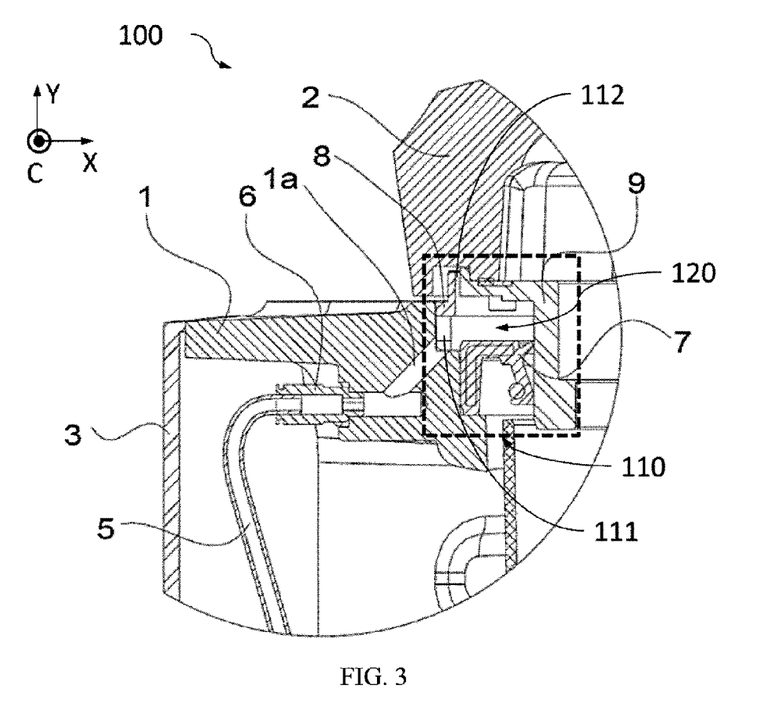
FIG. 3 shows an exploded perspective view of the sealing arrangement for use in a robot joint, according to embodiments of the present disclosure.

FIG. 3 shows a detailed side view of the sealing arrangement 100 for use in a robot joint 200 as illustrated in FIG. 1. The sealing arrangement 100 generally includes a circular sealing assembly 110 (with its cross section being labeled by a dashed box) and an air channel 1a coupled to the sealing assembly 110. As shown in FIG. 3, the circular sealing assembly 110 is arranged between the swing 2 and the base 1 of the robot joint 200 in a longitudinal direction Y. In other words, the circular sealing assembly 110 is arranged surrounding the Axis 1 structure for sealing the gap existing between the swing 2 and the base 1 of the robot joint 200. The sealing arrangement 100 as shown in FIG. 3 can rely on its walls to effectively isolate the internal space of Axis 1 from the external solid contaminants.

Still in reference to FIG. 3, the circular sealing assembly 110 defines a tubular cavity 120 in a circumferential direction C and has a gas inlet 111 and a gas outlet 112 connected with the cavity 120. The air channel 1a is coupled to the gas inlet 111 and operable to continuously conduct pressured air flow into the cavity 120 to maintain an air pressure inside the cavity 120 above an air pressure outside the cavity 120, and thereby a high-speed airflow coming out of the gas outlet. The higher air pressure inside the cavity 120 along with the high-speed air flow coming out of the gas outlet 112 helps further improve the sealing effect, because the pressured air coming out of the cavity 120 through the gas outlet 112 can further stop the liquid contaminant, such as slurry-like mixture, infiltrating into the cavity and the internal space of Axis 1 structure.

In some embodiments, the gas outlet 112 has a relative small feature size, for example, approximately 1 mm. Such small feature size, on one hand, is beneficial to keep a relatively strong air flow coming out of the gas outlet 112, and on the other hand, will prevent the contaminants from infiltrating into the internal space of the cavity 120 and thus into the internal space of the robot joint 200. It is to be understood that although FIG. 3 shows a vertically oriented gas outlet 112, the scope of the present disclosure is not limited to the shape or the orientation of the gas outlet 112. Those skilled in the art would have a motivation to modify the shape or the orientation of gas outlet 112 according to the requirements.

Figure 4:
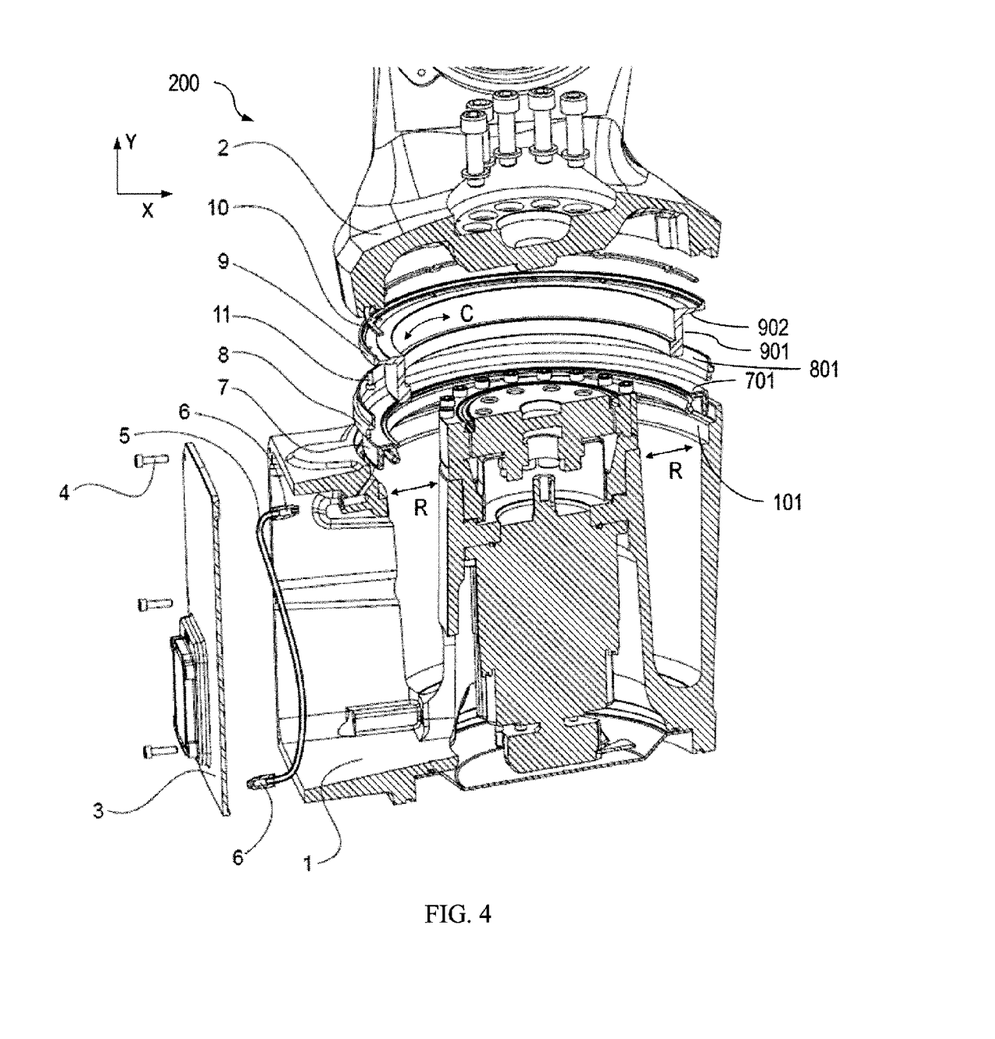
FIG. 4 shows a detailed side view of the sealing arrangement for use in a robot joint, according to embodiments of the present disclosure.

FIG. 4 shows an exploded perspective view of the sealing arrangement 100 for use in a robot joint 200. As shown, in this embodiment, the circular sealing assembling 110 includes a sealing ring 9. The sealing ring 9 forms a first side wall 901 and a top wall 902 of the cavity 120. As illustrated in FIG. 4, the sealing ring 9 has a substantially inverted "L" shaped cross section. The first side wall 901 is oriented in the longitudinal direction Y and the top wall 902 is to be fixed to the swing 2 and oriented in a horizontal direction X that is substantially perpendicular to the longitudinal direction Y.

In some embodiments, the sealing ring 9 is fixed to the swing 2 via fixing means. For example, as shown in FIG. 4, the sealing ring 9 can be fixed to the swing 2 via at least one screw 11. In some embodiments, an intermediate part, such as gasket 10, is arranged between an end surface of the swing 2 and the sealing ring 9 in order to provide additional sealing between the two components. The scope of the present disclosure is not limited by the type of fixing/connecting mechanism between the sealing ring 9 and the swing 2. Any suitable fixing/connecting mechanisms, such as a clip assembly, a magnet assembly, and an adhesive assembly that can achieve same or similar sealing effect are possible as well.

In some embodiments, the circular sealing assembling 110 may further include a base ring 8. The base ring 8 is coaxially arranged with the sealing ring 9 and forms a second side wall 801 of the cavity 120. The second side wall 801 is oriented opposite to the first side wall 901. In other words, the second side wall 801 is also substantially oriented in the longitudinal Y direction. In some embodiments, the second side wall 801 is fixed at the top opening of the base 1 via interference fit. Of course, other securing mechanisms of the base ring 8 onto the top opening of the base 1 are also possible. Such vertically oriented base ring 8 (or the second side wall 801 of the cavity 120) as shown in FIG. 3 or 4 functions as the outmost barrier/blocking component which can effectively stop the solid contaminants to enter the internal space of Axis 1 structure.

Alternatively, or in addition, in some embodiments, the circular sealing assembling 110 further includes a radial seal 7. The radial seal 7 is also arranged coaxially with the sealing ring 9 and forming a bottom wall 701 of the cavity 120. As shown in FIG. 4, the radial seal 7 may be positioned between a third side wall 101 of the base 1 and the first side wall 901 in a radial direction R. In such embodiment, the gas inlet 111 is defined by the radial seal 7 and the base ring 8, and the gas outlet 112 is defined by the sealing ring 9 and the base ring 8. In this way, the size of gas inlet 111 and gas outlet 112 can both be properly designed and tuned.

In some embodiments, the radial seal 7 is elastically arranged between the third side wall 101 and the first side wall 901 to abut against the third side wall 101 and the first side wall 901 in the radial direction R. For example, the radial seal 7 may have an inverted "V" shaped cross section (or the so-called V-shaped sealing ring), and at least a portion of the radial seal 7 is made of flexible material such as rubber. The V-shaped sealing ring 7 can help achieve a better sealing effect as it enables a sufficient contact with the counterpart surface and the compressed amount is tunable via the angle of the V-shaped cross section.

Figure 5:
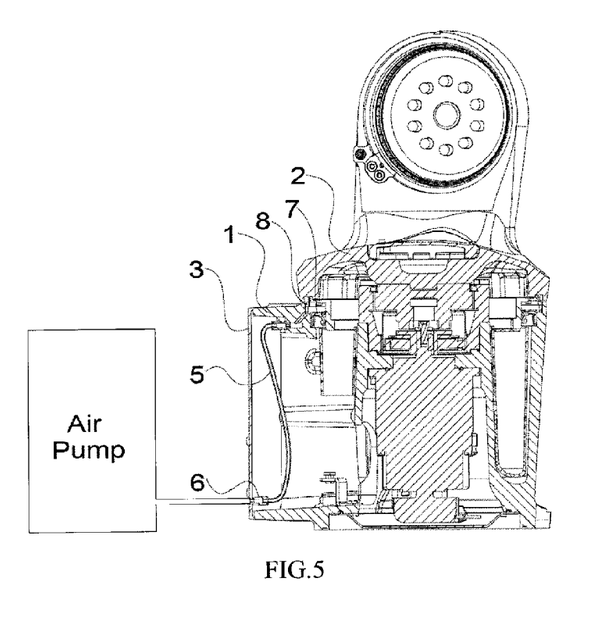
FIG. 5 shows a cross-sectional view of the sealing arrangement for use in a robot joint according to embodiments of the present disclosure.

The sealing arrangement 100 may further include an air tube 5 which is connected to the air channel 1a via a tube connector 6. The air tube 5 is operable to conduct the pressured air that is supplied from an external air source as shown in FIG. 5 into the cavity 20. One end of the tube connector 6 is shaped to fit with the channel 1a and the other end of the tube connector 6 is shaped to receive the tube 5, so that the connector 6 can be detachably connected with both the channel 1a and the tube 5.

Returning to FIG. 3, in some embodiments, the channel 1a is built as part of the top wall of the base 1, which may improve the integrity of the whole sealing arrangement 100 and meanwhile saves the internal space for accommodating the channel 1a. It is to be understood that the example described with reference to FIG. 3 is only for illustration, without suggesting any limitations as to the scope of the present disclosure. The channel 1a with any other suitable shape, dimension, or orientation can be utilized in the sealing arrangement 100.

In some embodiments, the air pressure inside the cavity 120 can be in a relatively broad range of 35 KPa to 55 KPa. However, in an ideal case, the air pressure inside the cavity 120 is properly tuned to approximately 45 KPa. Such properly tuned air pressure inside the cavity 120 is beneficial, because it not only provides a stable and sufficient pressure to against the contaminant's infiltration, but also avoids a too high pressure at which the radial seal 7 may lose its sealing ability.

Figure 6:
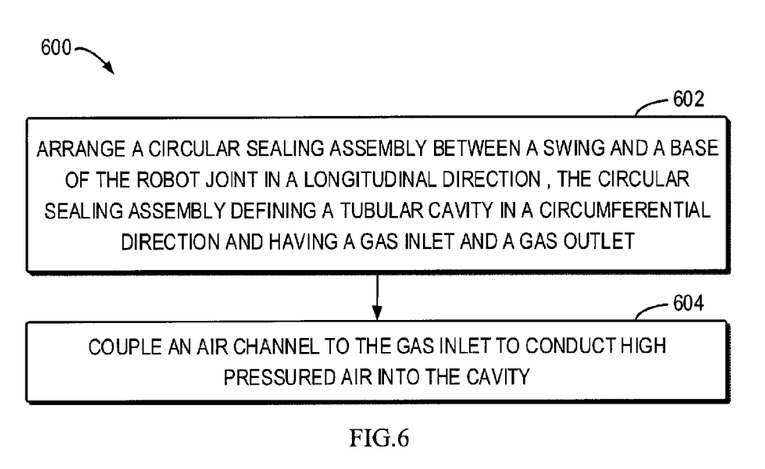
FIG. 6 is a flowchart of manufacturing a sealing arrangement according to embodiments of the present disclosure.
Figure 7:
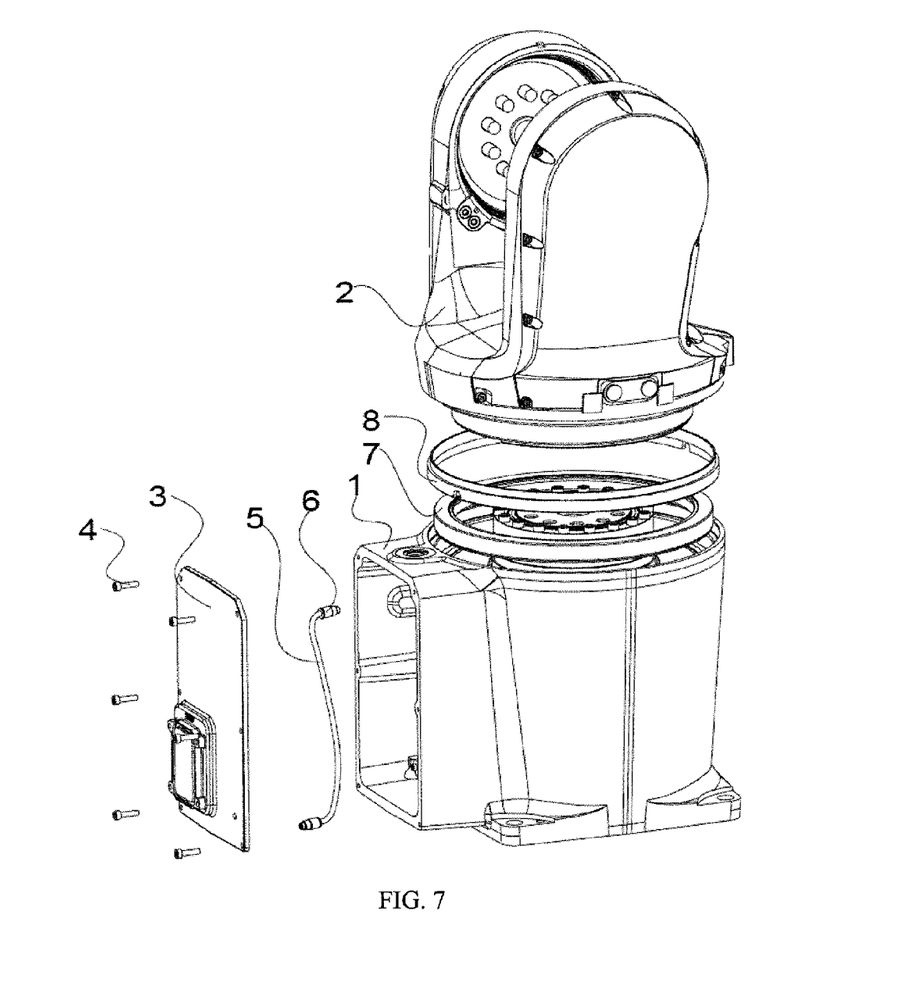
FIG. 7 shows an exploded view of the sealing arrangement for use in a robot joint in an unassembled state, according to embodiments of the present disclosure.

FIG. 6 is a flowchart of a method 600 for manufacturing a sealing arrangement 100 according to embodiments of the present disclosure. FIG. 7 shows an exploded view of the sealing arrangement for use in a robot joint in an unassembled state, according to embodiments of the present disclosure.

In accordance with embodiments of the present disclosure, the sealing arrangement 100 as described above can be manufactured in a simple and straightforward way. Actions of the method 600 will now be described with reference to FIGS. 6 and 7.

At block 602, the circular sealing assembly 110 defining a tubular cavity 120 in a circumferential direction C and having a gas inlet 111 and a gas outlet 112 is arranged between the swing 2 and the base 1 of the robot joint 200 in a longitudinal direction Y. In some embodiments, arranging the circular sealing assembly 110 may include arranging the base ring 8 via interference fit to an upper opening of the base 1 to define a second side wall 801 of the cavity 120; arranging the radial seal 7 coaxially with the base ring 8 to define the bottom wall 701 of the cavity 120; and arranging the sealing ring 9 pre-fixed to the swing 2 to define the first side wall 901 and the top wall 902 of the cavity 120, respectively.

At block 604, an air channel 1a is coupled to the gas inlet 111 to conduct high pressured air into the cavity 120. In some embodiments, coupling the air channel to the gas inlet to conduct pressured air includes: connecting one end of an air tube 5 to the air channel 1a via a tube connector 6; connecting the other end of the air tube 5 to an external air source; and supplying the pressured air from the external air source to the cavity 120. Optionally, method 600 may further includes fixing a base cover 3 with some screws 4 in order isolate the external air source from the air tube 5 and therefore the internal space of the base 1.

In an example, the ideal inside pressure is set to be 45 KPa. In order to achieve such an ideal inside pressure, the air pressure that actually needs to be pumped into the gas inlet 111 is in a range of 50 KPa to 55 KPa considering the air leakage from gas outlet 112. In this example, the upper limit of 55 KPa indicates an air pressure level beyond which the radial seal 7 may lose its sealing ability, and the lower level of 50 KPa indicates an air pressure at which the sealing arrangement 100 may not be able to provide stable and sufficient air flow to against the contaminant infiltration.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. A sealing arrangement for use in a robot joint, comprising:
    a circular sealing assembly arranged between a swing and a base of the robot joint in a longitudinal direction, the circular sealing assembly defining a tubular cavity in a circumferential direction and having a gas inlet and a gas outlet, and comprising a sealing ring forming a first side wall and a top wall of the cavity, wherein the first side wall is oriented in the longitudinal direction and the top wall is fixed to the swing and oriented in a horizontal direction that is substantially perpendicular to the longitudinal direction; and
    an air channel coupled to the gas inlet and operable to conduct pressured air into the cavity to maintain an air pressure inside the cavity above an air pressure outside the cavity.

2. The sealing arrangement according to claim 1, wherein the circular sealing assembly comprises:

a base ring coaxially arranged with the sealing ring and forming a second side wall of the cavity, wherein the second side wall is oriented opposite to the first side wall.

3. The sealing arrangement according to claim 1, wherein the circular sealing assembly further comprises:
a radial seal arranged coaxially with the sealing ring and forming a bottom wall of the cavity, wherein the radial seal is positioned between a third side wall of the base and the first side wall in a radial direction.

4. The sealing arrangement of claim 3, wherein the radial seal is elastic and is arranged between the third side wall and the first side wall to abut against the third side wall and the first side wall in the radial direction.

5. The sealing arrangement of claim 4, wherein at least a portion of the radial seal is made of flexible material.

6. The sealing arrangement of claim 5, wherein the flexible material is rubber.

7. The sealing arrangement according to claim 1, further comprising:
an air tube connected to the air channel via a tube connector, wherein the air tube is operable to conduct the pressured air that is supplied from an external air source.

8. The sealing arrangement according to claim 1, wherein the air pressure inside the cavity is in a range of 35 KPa to 55 KPa.

9. The sealing arrangement of claim 8, wherein the air pressure inside the cavity is approximately 45 KPa.

10. The sealing arrangement according to claim 2, wherein the circular sealing assembly further comprises:
a radial seal arranged coaxially with the sealing ring and forming a bottom wall of the cavity, wherein the radial seal is positioned between a third side wall of the base and the first side wall in a radial direction.

11. The sealing arrangement of claim 10, wherein the radial seal is elastic and is arranged between the third side wall and the first side wall to abut against the third side wall and the first side wall in the radial direction.

12. The sealing arrangement according to claim 2, further comprising:
an air tube connected to the air channel via a tube connector, wherein the air tube is operable to conduct the pressured air that is supplied from an external air source.

13. The sealing arrangement of claim 11, wherein at least a portion of the radial seal is made of flexible material.

14. The sealing arrangement of claim 13, wherein the flexible material is rubber.

15. The sealing arrangement of claim 14, further comprising:
an air tube connected to the air channel via a tube connector, wherein the air tube is operable to conduct the pressured air that is supplied from an external air source.

16. The sealing arrangement of claim 15, wherein the air pressure inside the cavity is in a range of 35 KPa to 55 KPa.

17. The sealing arrangement of claim 16, wherein the air pressure inside the cavity is approximately 45 KPa.

18. The sealing arrangement of claim 12, wherein a radial seal is elastic and is arranged between a third side wall and the first side wall to abut against the third side wall and the first side wall in a radial direction.

19. The sealing arrangement of claim 18, wherein at least a portion of the radial seal is made of flexible material.

20. A robot joint, comprising:
a base;
a swing coupled to the base; and
a sealing arrangement including:
a circular sealing assembly arranged between a swing and a base of the robot joint in a longitudinal direction, the circular sealing assembly defining a tubular cavity in a circumferential direction and having a gas inlet and a gas outlet, and comprising a sealing ring forming a first side wall and a top wall of the cavity, wherein the first side wall is oriented in the longitudinal direction and the top wall is fixed to the swing and oriented in a horizontal direction that is substantially perpendicular to the longitudinal direction; and
an air channel coupled to the gas inlet and operable to conduct pressured air into the cavity to maintain an air pressure inside the cavity above an air pressure outside the cavity.

* * * * *